(12) United States Patent
Nakashima et al.

(10) Patent No.: US 8,446,708 B2
(45) Date of Patent: May 21, 2013

(54) SOLID ELECTROLYTIC CAPACITOR AND POWER CIRCUIT

(75) Inventors: Tomokazu Nakashima, Kawasaki (JP); Masayuki Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 13/151,448

(22) Filed: Jun. 2, 2011

(65) Prior Publication Data

US 2011/0304954 A1 Dec. 15, 2011

(30) Foreign Application Priority Data

Jun. 15, 2010 (JP) ................................. 2010-136144

(51) Int. Cl.
*H01G 9/00* (2006.01)

(52) U.S. Cl.
USPC ........... 361/523; 361/525; 361/528; 361/529; 361/532; 361/540

(58) Field of Classification Search ................... 361/523, 361/525, 528–529, 530, 532, 535, 536, 516–519; 29/25.01, 25.03
See application file for complete search history.

(56) References Cited

U.S. PATENT DOCUMENTS

| | | | |
|---|---|---|---|
| 4,417,298 A | 11/1983 | Nakata et al. | |
| 5,469,326 A * | 11/1995 | Kanetake | 361/534 |
| 6,462,936 B1 * | 10/2002 | Fujimoto et al. | 361/525 |
| 6,552,896 B1 * | 4/2003 | Igaki et al. | 361/523 |
| 6,816,358 B2 * | 11/2004 | Kida et al. | 361/540 |
| 6,891,717 B2 * | 5/2005 | Fujii et al. | 361/523 |
| 7,193,840 B2 * | 3/2007 | Ohtsu | 361/541 |
| 7,359,180 B2 * | 4/2008 | Kurita et al. | 361/528 |
| 7,542,267 B2 * | 6/2009 | Ishijima | 361/523 |
| 2003/0218858 A1 | 11/2003 | Kim et al. | |
| 2004/0027789 A1 | 2/2004 | Kochi et al. | |
| 2007/0081301 A1 | 4/2007 | Tanaka | |
| 2008/0158782 A1 | 7/2008 | Cheng et al. | |
| 2010/0073848 A1 | 3/2010 | Kobayashi et al. | |

FOREIGN PATENT DOCUMENTS

| | | |
|---|---|---|
| DE | 102005007582 A1 | 8/2006 |
| JP | 54-78458 A | 6/1979 |
| JP | 05-182708 A | 7/1993 |
| JP | 2004-247665 A | 9/2004 |
| JP | 2005-150674 A | 6/2005 |
| JP | 2008-091389 A | 4/2008 |

OTHER PUBLICATIONS

European Search Report dated Sep. 6, 2011, issued in corresponding European Patent Application No. 11168830.5-2214.

* cited by examiner

*Primary Examiner* — Nguyen T Ha

(57) ABSTRACT

A solid electrolytic capacitor includes a capacitor element having two opposite cathode surfaces, a cathode terminal metal plate having a first cathode connecting portion electrically connected to one of the two opposite cathode surfaces, and an auxiliary cathode metal plate having a second cathode connecting portion electrically connected to the other one of the two opposite cathode surfaces of the capacitor element. The cathode terminal metal plate includes a groove electrically connected to the first cathode connecting portion. The auxiliary cathode metal plate includes an end portion that is electrically connected to the second cathode connecting portion and engages with the groove. The cathode terminal metal plate further includes an outer terminal portion.

12 Claims, 18 Drawing Sheets

SOLID ELECTROLYTIC CAPACITOR AND POWER CIRCUIT

CROSS-REFERENCE TO RELATED APPLICATION

This application is based upon and claims the benefit of priority of the prior Japanese Patent Application No. 2010-136144, filed on Jun. 15, 2010, the entire contents of which are incorporated herein by reference.

FIELD

The embodiments discussed herein are related to a solid electrolytic capacitor and a power circuit using the same.

BACKGROUND

Solid electrolytic capacitors are used in electronic circuits. For example, they are placed close to each power supply terminal of LSI devices and other integrated circuits.

A known solid electrolytic capacitor is made up of a capacitor element, an anode lead frame connected to the anode of the capacitor element, a cathode lead frame connected to the cathode of the capacitor element, and an exterior resin sealing the capacitor element. The anode lead frame and the cathode lead frame are partially exposed on the outside of the exterior resin.

For the purpose of reducing the equivalent series resistance (ESR) of such capacitors, the contact area between the capacitor element and cathode terminal lead frame is expanded. Specifically, at least one auxiliary cathode lead frame is connected to the capacitor element, and the auxiliary cathode lead frame and the cathode lead frame are interconnected (for example, see Japanese Laid-open Patent Publication No. 2004-247665).

However, a poor connection between the auxiliary cathode lead frame and the cathode lead frame may result from part size variations and vibrations generated at the time of manufacturing. In the worst case, the auxiliary cathode lead frame may have no connection with the cathode lead frame.

The lack of connection between the auxiliary cathode lead frame and the cathode lead frame results in an increased ESR and prevents desired electrical characteristics from being obtained. The two lead frames may only be jointed in a small contact area, if not completely separated. In this case, the connection resistance becomes larger, so the obtained ESR value may be larger than the desired value. Furthermore, if the auxiliary cathode lead frame is displaced from its normal position, the inner parts of the capacitor may be exposed from the exterior resin.

SUMMARY

According to an aspect of the present invention, there is provided a solid electrolytic capacitor including a capacitor element having two opposite cathode surfaces; a first electrode member having a first connecting portion electrically connected to one of the two opposite cathode surfaces of the capacitor element; and a second electrode member having a second connecting portion that is electrically connected to the other one of the two opposite cathode surfaces of the capacitor element. The first electrode member further includes a first engagement portion electrically connected to the first connecting portion. The second electrode member includes a second engagement portion that is electrically connected to the second connecting portion and engages with the first engagement portion. Either one of the first electrode member and the second electrode member includes an outer terminal portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be described in detail with reference to the accompany drawings.

First Embodiment

Figure 1:
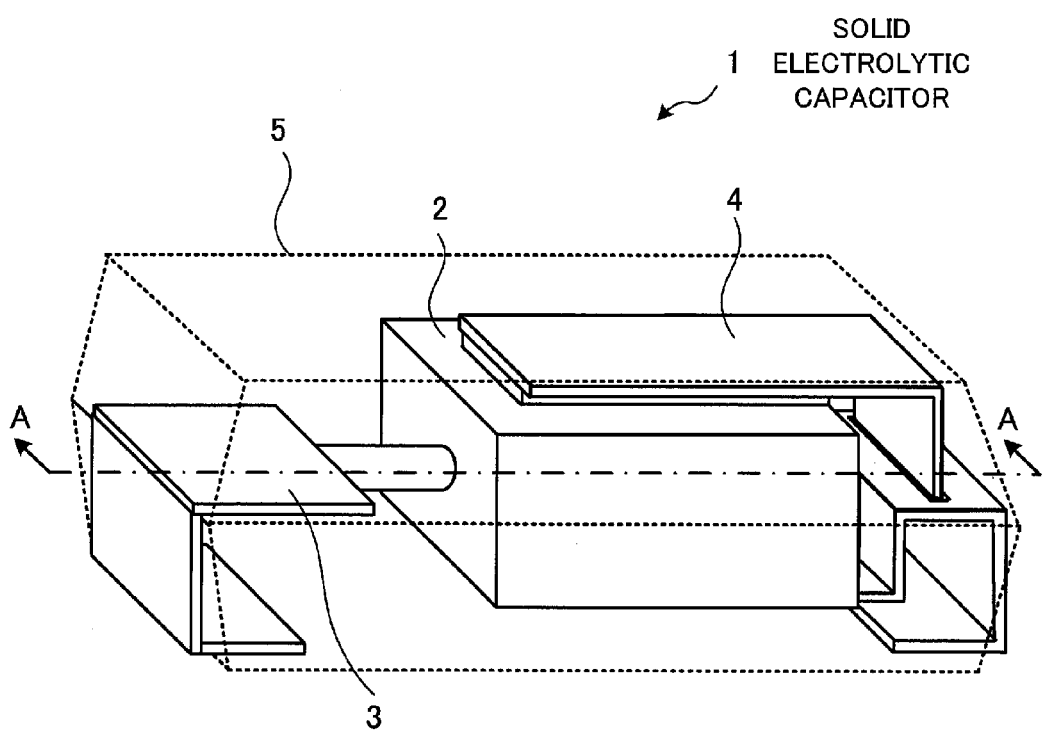
FIG. 1 is a perspective view illustrating a solid electrolytic capacitor according to a first embodiment.

FIG. 1 is a perspective view illustrating a solid electrolytic capacitor according to a first embodiment.

The following description uses the expressions "top," "bottom," "left," and "right" to designate various parts of the solid electrolytic capacitor according to the first embodiment assuming that the capacitor is disposed in the orientation illustrated in FIG. 1.

According to the first embodiment, a solid electrolytic capacitor 1 includes a capacitor element 2, an anode electrode 3, a cathode electrode 4, and a mold 5.

In the solid electrolytic capacitor 1, the capacitor element 2 is electrically connected to the anode electrode 3 and the cathode electrode 4 so that the capacitor element 2 is surface-mounted on a printed-circuit board or the like.

The cathode electrode 4 holds the capacitor element 2 on both the top and bottom surfaces thereof.

The mold 5 seals the capacitor element 2, a part of the anode electrode 3, and a part of the cathode electrode 4. In FIG. 1, the mold 5 is illustrated with dotted lines so that the inside thereof is visible.

The mold 5 may be manufactured, for example, by transfer molding, where resin is preheated and injected into a die cavity under pressure.

Examples of the material of the mold 5 include epoxy resin.

Figure 2:
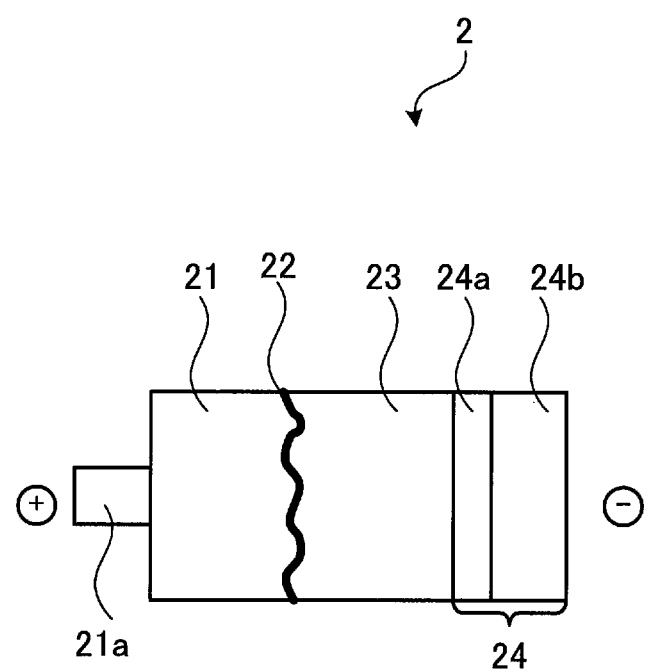
FIG. 2 illustrates a configuration of a capacitor element.

FIG. 2 illustrates a configuration of a capacitor element.

The illustrated capacitor element 2 includes an anode body 21, an anode wire 21a, a dielectric film layer 22, a solid-electrolyte layer 23, and an electric conductor layer (cathode layer) 24.

The anode body 21 is made from a porous sintered compact of valve metal particles.

The anode body 21 is formed around an anode wire 21a made from the same valve metal as the anode body 21. The anode wire 21a partially protrudes from the anode body 21.

The anode wire 21a is connected to the anode electrode 3 by welding or the like.

Examples of the material of the anode body 21 and the anode wire 21a include aluminum (Al), tantalum (Ta), niobium (Nb), titanium (Ti), zirconium (Zr), magnesium (Mg), silicon (Si), and alloys thereof.

The solid electrolytic capacitor 1 may be, for example, a tantalum capacitor. Tantalum capacitors are manufactured from a powder of tantalum metal. The powder is compressed around a tantalum anode wire 21a and vacuum-sintered to form the anode body 21.

The dielectric film layer 22 is made of an oxide of the valve metal as a dielectric substance. The dielectric film layer 22 is provided on the surface of the anode body 21 with a predetermined thickness.

The dielectric film layer 22 is formed by oxidizing the surface of the anode body 21. In the case of a tantalum sintered compact as the anode body 21, the dielectric film layer 22 is made of tantalum pentoxide ($Ta_2O_5$).

The solid-electrolyte layer 23 is provided on the surface of the dielectric film layer 22.

Examples of the material of the solid-electrolyte layer 23 include organic materials such as conductive polymers and inorganic materials such as metallic oxides like $MnO_2$.

The electric conductor layer 24 includes a conductive carbon layer 24a containing carbon particles, and a silver paste layer 24b containing silver particles.

Figure 3:
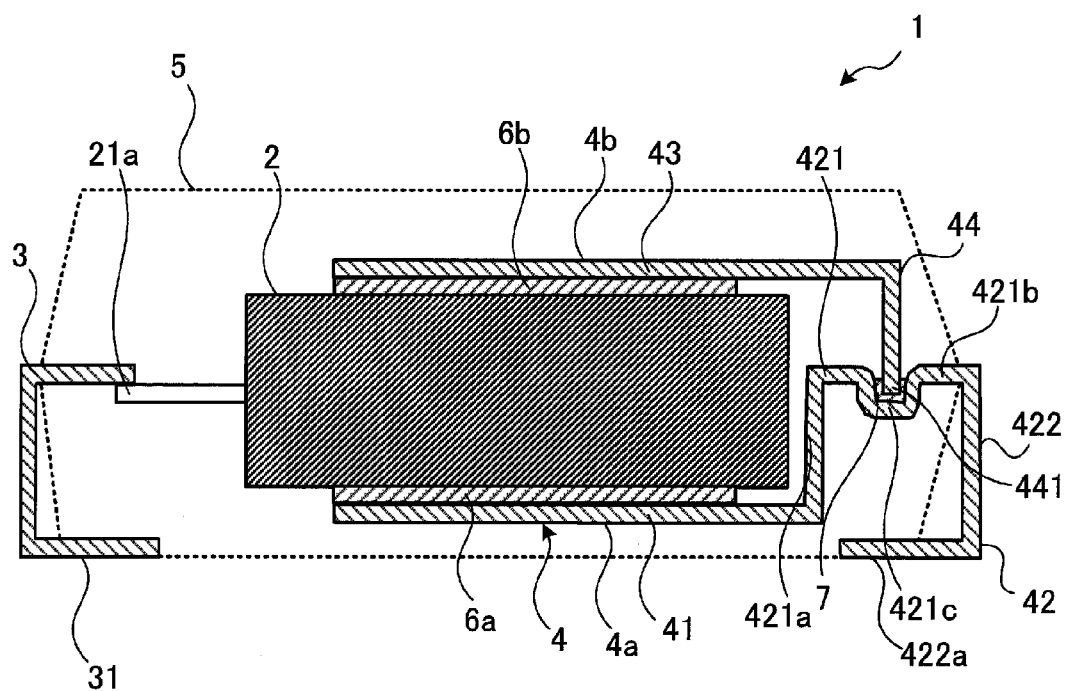
FIG. 3 illustrates a longitudinal section of the solid electrolytic capacitor, taken from line A-A of FIG. 1.

FIG. 3 illustrates a longitudinal section of the solid electrolytic capacitor, taken from line A-A of FIG. 1.

The anode electrode (anode terminal metal plate) 3 is formed by bending a rectangular metal plate having a thickness of about 0.1 mm.

As mentioned above, the anode electrode 3 is electrically connected to the anode wire 21a by welding or the like. Referring to FIG. 3, the anode electrode 3 is partially exposed on the outside of the mold 5. The exposed section of the anode electrode 3 protrudes from a nearly central part of the left side surface, bending along the mold 5. An end 31 of the exposed section of the anode electrode 3 reaches the bottom surface of the mold 5. The exposed section works as a terminal to be used for mounting the solid electrolytic capacitor 1 on a circuit board or the like.

Examples of the material of the anode electrode 3 include alloys of copper such as Cu—Ni alloys, Cu—Sn alloys, Cu—Fe alloys, Cu—Ni—Sn alloys, Cu—Co—P alloys, and Cu—Sn—Ni—P alloys.

The cathode electrode 4 includes a cathode terminal metal plate (first electrode member) 4a, and an auxiliary cathode metal plate (second electrode member) 4b.

The cathode terminal metal plate 4a is formed by bending a rectangular metal plate having a thickness of about 0.1 mm.

The cathode terminal metal plate 4a includes a cathode connecting portion (first connecting portion) 41 extending from the left side of FIG. 3, and a terminal portion 42 extending to the cathode connecting portion 41.

Referring to FIG. 3, the cathode connecting portion 41 extends along the bottom surface of the capacitor element 2. The cathode connecting portion 41 is electrically connected to the electric conductor layer 24a of the capacitor element 2 with a conductive layer 6a therebetween.

Examples of the material of the layer 6a include a conductive thermosetting paste containing metal powders such as silver powder and a thermosetting resin such as epoxy and modified silicone resin.

The terminal portion 42 includes a rising portion 421 having a wall 421a extending to the cathode connecting portion 41, and an outer terminal portion 422 extending to the rising portion 421.

The rising portion 421 rises from the cathode connecting portion 41 so that the outer terminal portion 422 protrudes from a nearly central part of the right side surface of the mold 5, as illustrated in FIG. 3.

Although perpendicular to the cathode connecting portion 41 in FIG. 3, the wall 421a of the rising portion 421 may be obliquely angled at a predetermined value with respect to the cathode connecting portion 41.

The rising portion 421 has a top 421b parallel to the cathode connecting portion 41. Almost in the middle of the top 421b, a groove 421c is provided to engage with an end 441 of the auxiliary cathode metal plate 4b.

The groove 421c is easily formed, for example, by die extrusion.

The outer terminal portion 422 is exposed on the outside of the mold 5. The exposed section of the outer terminal portion 422 protrudes from a nearly central part of the right side surface of the mold 5, bending along the mold 5. An end 422a of the exposed section reaches the bottom surface of the mold 5. The exposed section works as a terminal to be used for mounting the solid electrolytic capacitor 1 on a circuit board or the like.

The auxiliary cathode metal plate 4b is formed by bending a rectangular metal plate having a thickness of about 0.1 mm.

The auxiliary cathode metal plate 4b includes a cathode connecting portion (second connecting portion) 43 and a terminal connecting portion 44. The terminal connecting portion 44 is bent into an L shape from the cathode connecting portion 43 toward the top 421b of the rising portion 421.

The cathode connecting portion 43 faces the cathode connecting portion 41 across the capacitor element 2. The cathode connecting portion 43 is electrically connected to the cathode of the capacitor element 2 with a conductive layer 6b therebetween.

The material of the layer 6b may be the same as the material of the layer 6a.

The end 441 of the terminal connecting portion 44 is fitted into the groove 421c to a predetermined depth. In this position, the edge of the end 441, which faces the bottom of the groove 421c, and the sides thereof, which face the sides of the groove 421c, are fixed to the groove 421c with a conductive connecting member 7 therebetween. The terminal connecting portion 44 is electrically connected to the rising portion 421 in this way. This connection prevents the auxiliary cathode metal plate 4b from moving in the vertical and depth directions of FIG. 3.

Examples of the material of the connecting member 7 include a conductive thermosetting paste containing metal powders such as silver powder and a thermosetting resin such as epoxy and modified silicone resin.

The end 441 and the groove 421c may be fixed to each other by welding.

As illustrated in FIG. 3, the length of the terminal connecting portion 44 is preferably determined so that the edge of the end 441 makes no contact with the bottom of the groove 421c. Specifically, there is preferably a predetermined space between the bottom of the groove 421c and the end 441 of the terminal connecting portion 44 fitted into the groove 421c. The reason is as follows. The terminal connecting portion 44 can be longer than its intended length due to manufacturing tolerance of the auxiliary cathode metal plates 4b. If this is the case, the edge of the end 441 may come into contact with the bottom of the groove 421c, thus producing a force that pushes the cathode connecting portion 43 away from the layer 6b. The above-noted predetermined space avoids such contact between the end 441 and the groove 421c, thereby preventing the auxiliary cathode metal plate 4b from separating from the capacitor element 2.

The cathode terminal metal plate 4a and the auxiliary cathode metal plate 4b may be made of the same material as the anode electrode 3.

Figure 4A:
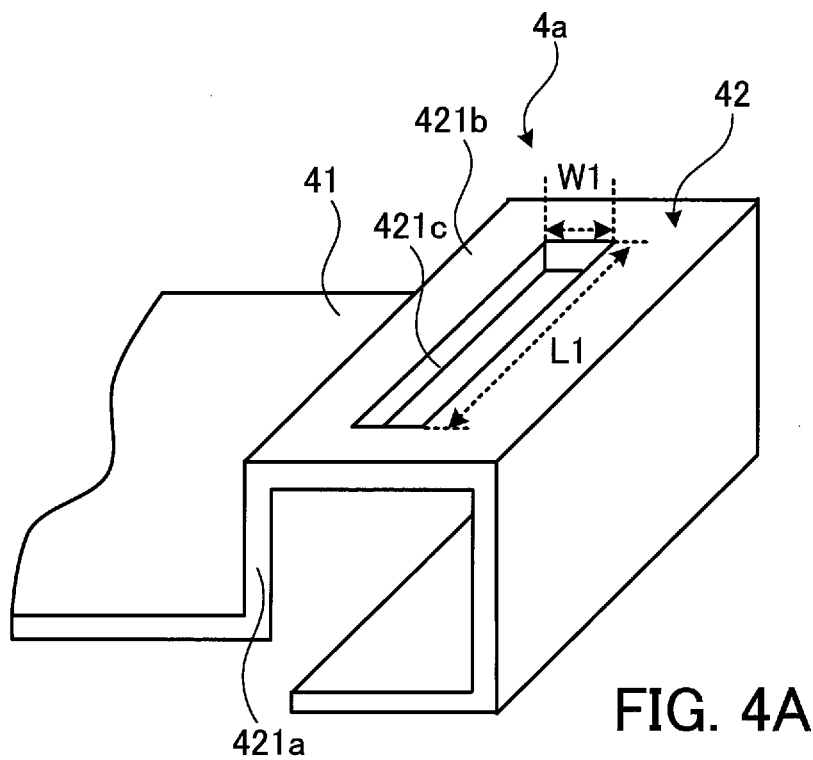
FIGS. 4A and 4B are perspective views illustrating a groove.
Figure 4B:
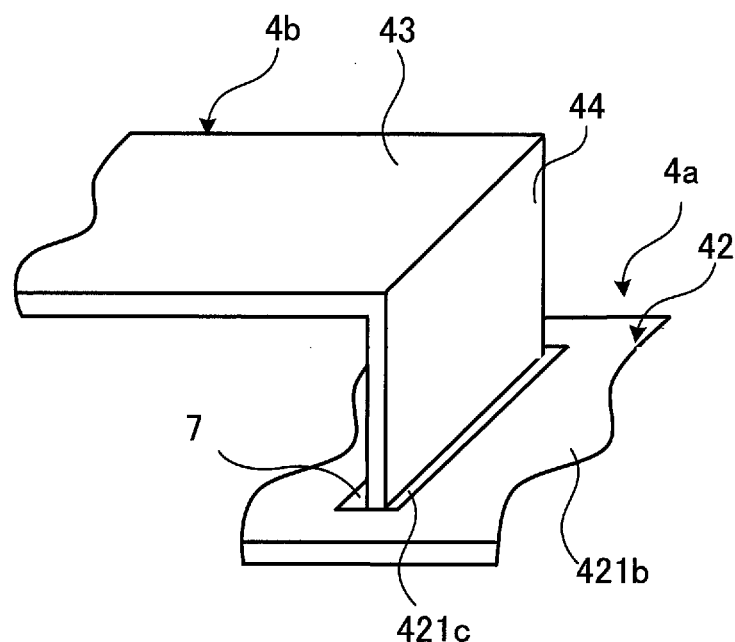

FIGS. 4A and 4B are perspective views illustrating the groove.

FIG. 4A is an enlarged view illustrating the rising portion 421 of the cathode terminal metal plate 4a. FIG. 4B is an enlarged view illustrating a state that the auxiliary cathode metal plate 4b is fitted into the groove 421c.

The size of the groove 421c (length L1, width W1) is the same as that of the end 441 of the auxiliary cathode metal plate 4b, or slightly larger than that of the end 441. This allows the end 441 to be inserted in the groove 421c.

Even if the end 441 shifts to a higher position at the time of manufacturing, this configuration maintains the contact between the auxiliary cathode metal plate 4b and the cathode terminal metal plate 4a in the groove 421c. As a result, the auxiliary cathode metal plate 4b and the cathode terminal metal plate 4a are not separated from each other, thereby securing the contact area therebetween.

Figure 5:
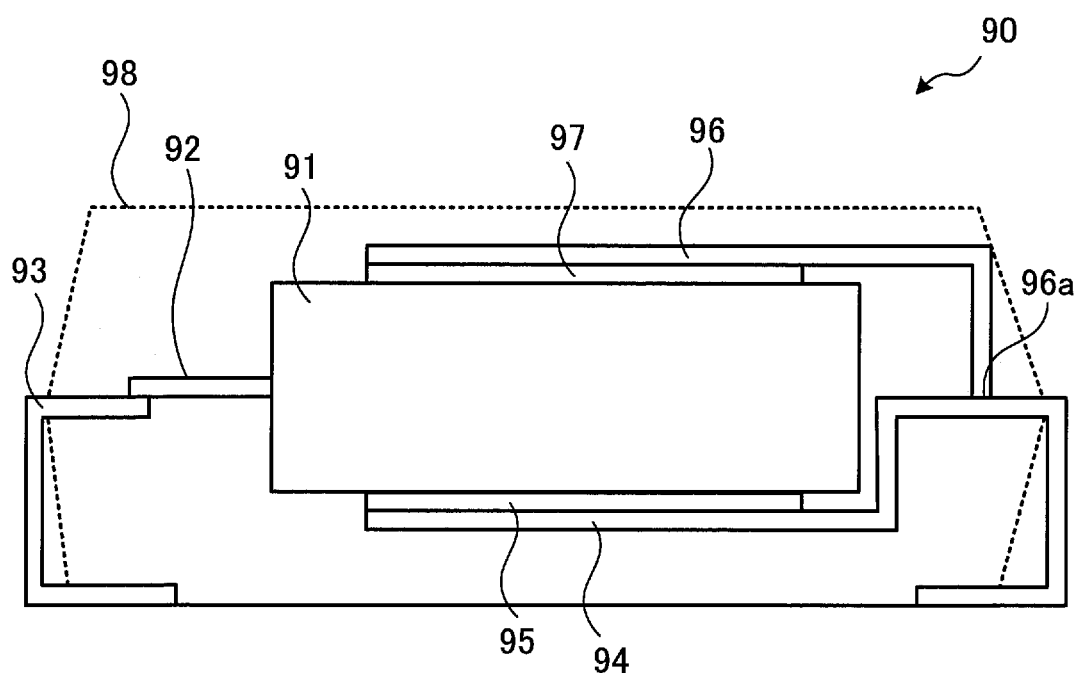
FIG. 5 is a side view illustrating another solid electrolytic capacitor as a comparative example.

FIG. 5 is a side view illustrating another solid electrolytic capacitor as a comparative example.

In a tantalum capacitor 90 illustrated in FIG. 5 as a comparative example, the anode body of a capacitor element 91 is formed around an anode wire 92. The anode wire 92 is connected to an anode lead frame (anode terminal) 93. The cathode extraction layer of the capacitor element 91 is connected to a cathode lead frame (cathode terminal) 94 with a conductive adhesive 95 therebetween.

An L-shaped auxiliary cathode lead frame 96 is connected to the cathode extraction layer by a conductive adhesive 97. The cathode lead frame 94 and the auxiliary cathode lead frame 96 are connected by laser welding. The entire capacitor element 91 is sealed with an exterior resin 98. The cathode lead frame 94 and the anode lead frame 93 are partially exposed on the outside of the exterior resin 98.

In the tantalum capacitor 90, only an end face 96a of the auxiliary cathode lead frame 96 is in contact with the cathode lead frame 94, before welding.

Therefore, if the auxiliary cathode lead frame 96 is shorter than its intended length, the connection between the end face 96a and the cathode lead frame 94 tends to be poor. The reason is as follows. The position of the auxiliary cathode lead frame 96 is unadjustable because the position is determined by the height of the capacitor element 91. In this case, only a part of the end face 96a is welded to the cathode lead frame 94. On the other hand, if the auxiliary cathode lead frame 96 is longer than its intended length, even though the end face 96a is in contact with the cathode lead frame 94, the auxiliary cathode lead frame 96 and the capacitor element 91 sometimes become detached from the conductive adhesive 97. Both of these cases end up with a higher equivalent series resistances (ESR), compared to, the case where a proper connection is made.

ESR represents a series resistance component in the equivalent circuit of a capacitor, as one of the parameters representing electrical characteristics of the capacitor. The ESR of the above solid electrolytic capacitor means the overall resistance between the exposed sections of the anode lead frame 93 and the cathode lead frame 94. Electrically, the ESR value R is calculated as $R = r1 + r2 + r3 + r4$.

The value r1 means the resistance of a capacitor element. In the case of a tantalum capacitor, r1 means the resistance of the tantalum element. The value r2 means the resistance component of the dielectric substance of the capacitor. The values r1 and r2 are specific to each capacitor element. The value r3 means the sum of resistances of anode and cathode frames. The value r4 includes, for example, the resistance of a welded portion between the anode wire 92 and anode lead frame 93, and the resistance of a connected portion between the auxiliary cathode lead frame 96 and capacitor element 91.

As dielectric substances have been improved for ESR reduction, the resistance value r2 is reduced in recent products. As a result, the resistance values r3 and r4 have to be reduced in a relative sense.

The auxiliary cathode lead frame 96 is added to expand the electrode frame area, thereby reducing the resistance r3. The auxiliary cathode lead frame 96 is added also to expand the connection area with the capacitor element 91, thereby reducing the connection resistance r4. However, if the cathode lead frame 94 does not reach the auxiliary cathode lead frame 96, or if the cathode lead frame 94 is separated from the auxiliary cathode lead frame 96, the effect obtained by adding the auxiliary cathode lead frame 96 is lost, thereby losing the reduction in the resistances r3 and r4. In addition, even though the cathode lead frame 94 is not completely separated from the auxiliary cathode lead frame 96, if the contact area decreases, the contact resistance r4 is increased. In both cases, the sum R of the resistance values are increased, thereby preventing a desired ESR from being obtained.

On the other hand, the solid electrolytic capacitor 1 includes a terminal connecting portion 44 and a groove 421c which engages with an end 441 of the terminal connecting portion 44. As a result, even if the terminal connecting portion 44 of the auxiliary cathode metal plate 4b is shorter than its intended size, or even if the auxiliary cathode metal plate 4b is displaced from its normal position to some extent before fixation, the connection between the cathode terminal metal plate 4a and the auxiliary cathode metal plate 4b is secured, thereby preventing the contact resistance from being greater. Therefore, the increase in ESR value is prevented, and stable electrical characteristics are achieved.

Furthermore, the ESR value of the solid electrolytic capacitor 1 is prevented from increasing, thereby archiving the solid electrolytic capacitor 1 having a low ESR with stability.

At the time of manufacturing, the positioning of the auxiliary cathode metal plate 4b relative to the cathode terminal metal plate 4a becomes easier, thereby increasing productivity.

At the time of manufacturing, the cathode terminal metal plate 4a is connected without pressing the auxiliary cathode metal plate 4b. As a result, no mechanical stress is applied to the capacitor element 2, thereby improving the yield rate of a solid electrolytic capacitor 1.

Since the end 441 is fitted into the groove 421c, the angle and the position of the auxiliary cathode metal plate 4b are fixed. This prevents the auxiliary cathode metal plate 4b from being angled in the vertical direction of FIG. 5 at the time of manufacturing. This also prevents the terminal connecting portion 44 from moving outward (horizontal direction of FIG. 6) and exposing itself on the surface of the exterior resin 98.

Figure 6:
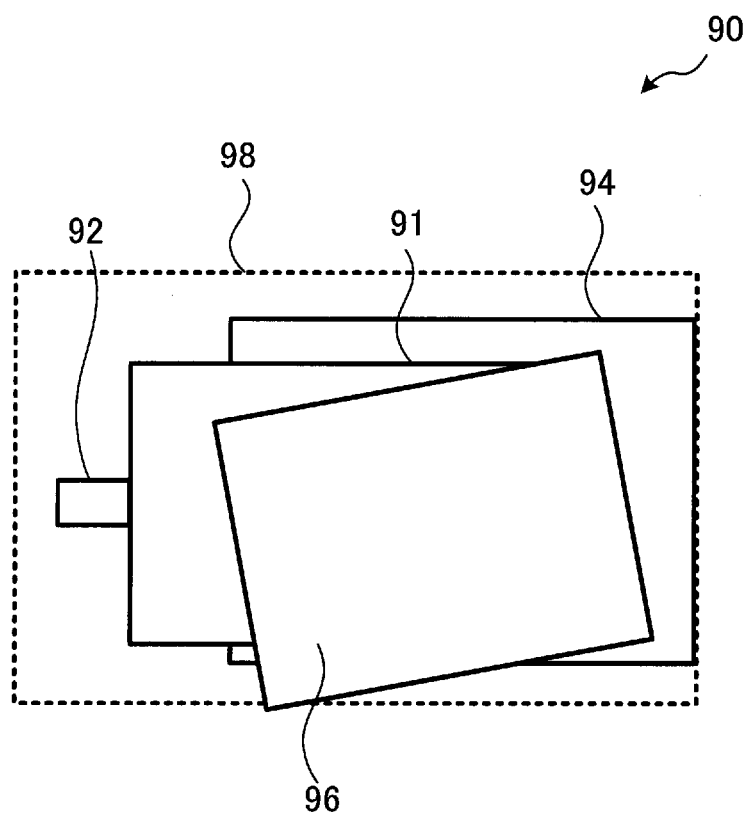
FIG. 6 illustrates a case in which an auxiliary cathode metal plate is not oriented properly with respect to a cathode terminal metal plate.

FIG. 6 illustrates a case in which the auxiliary cathode metal plate is not oriented properly with respect to the cathode terminal metal plate.

In the tantalum capacitor 90 of FIG. 5 discussed above, the cathode lead frame 94 and the auxiliary cathode lead frame 96 are to be connected by laser welding. It is difficult, however, to position the auxiliary cathode lead frame 96 properly with respect to the cathode lead frame 94 for their connection. Therefore, if the auxiliary cathode lead frame 96 is fixed to the cathode lead frame 94 at an angle as illustrated in FIG. 6, the auxiliary cathode lead frame 96 is sometimes exposed from the exterior resin 98. Even though not angled, if the auxiliary cathode lead frame 96 is fixed in a state that the auxiliary cathode lead frame 96 is displaced in a lateral direction, the auxiliary cathode lead frame 96 is sometimes exposed from the exterior resin 98 in the same way. In the side view of FIG. 5, the same holds true for the case in which the auxiliary cathode lead frame 96 is displaced to the right. Furthermore, if the auxiliary cathode lead frame 96 is displaced to the left, a mechanical stress is applied to the capacitor element 2, thereby worsening the yield rate.

On the other hand, in the solid electrolytic capacitor 1, the position and orientation of the auxiliary cathode metal plate 4b are fixed in both vertical and horizontal directions, thereby preventing the auxiliary cathode metal plate 4b from being exposed on the outside of the mold 5. As a result, the yield rate is improved.

Furthermore, no extra space margin is needed around the top 421b since any motion or inclination of the auxiliary cathode metal plate 4b relative to the cathode terminal metal plate 4a is prevented. The size of the top 421b can therefore be smaller, making it possible to miniaturize the solid electrolytic capacitor 1.

The above embodiment provides only one groove 421c. The embodiment is not limited to that specific example, but may be modified to provide two or more grooves 421c.

The above embodiment provides a predetermined space between the sides of the end portion and the sides of the groove 421c. The embodiment is not limited to that specific example, but may be modified to provide no space therebetween. The sides of the end portion may be press-fitted into the groove 421c.

<Exemplary Modification to First Embodiment>

Figure 7:
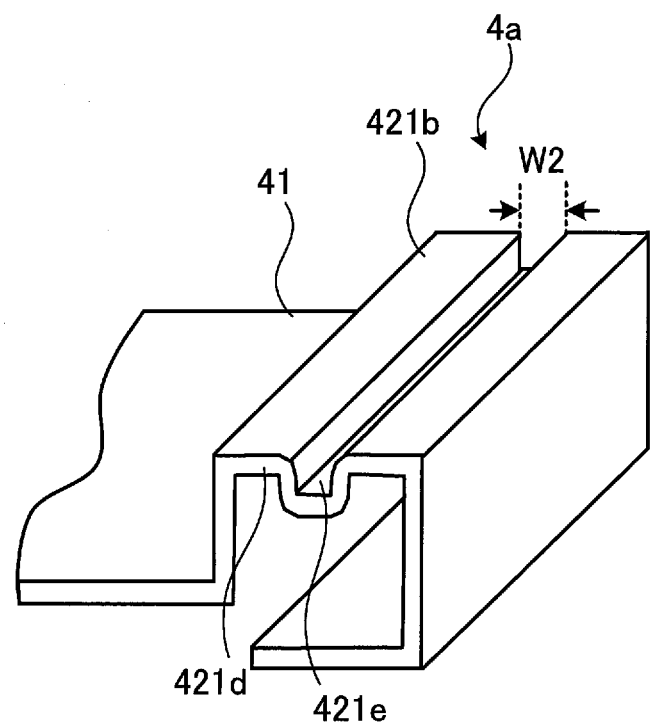
FIG. 7 is an enlarged view illustrating engagement between a cathode metal plate terminal and an auxiliary cathode metal plate of a solid electrolytic capacitor according to an exemplary modification to the first embodiment.

FIG. 7 is an enlarged view illustrating engagement between a cathode metal plate terminal and an auxiliary cathode metal plate of a solid electrolytic capacitor according to an exemplary modification to the first embodiment.

A solid electrolytic capacitor 1 illustrated in FIG. 7 includes a groove 421e instead of the groove 421c.

The sides of the groove 421e are open at both ends 421d of the top 421b, that is, in the longitudinal direction of an end face of the end 441.

The width W2 of the groove 421e is almost equal to the width W1 of the groove 421c so that the sides of the end 441 are positioned within the groove 421e.

The groove 421e is easily formed by bending.

The solid electrolytic capacitor 1 including the groove 421e produces the same effects. Furthermore, when an auxiliary cathode metal plate is mounted on the capacitor element, since there is no restriction in the longitudinal direction of the end 441 of the auxiliary cathode metal plate, positioning does not have to be performed with very high precision.

Second Embodiment

Next, a solid electrolytic capacitor according to a second embodiment is described.

Hereinafter, a description is given mainly for the differences between the solid electrolytic capacitor according to the second embodiment and the solid electrolytic capacitor according to the first embodiment, and the description of their similarities is omitted here.

Figure 8:
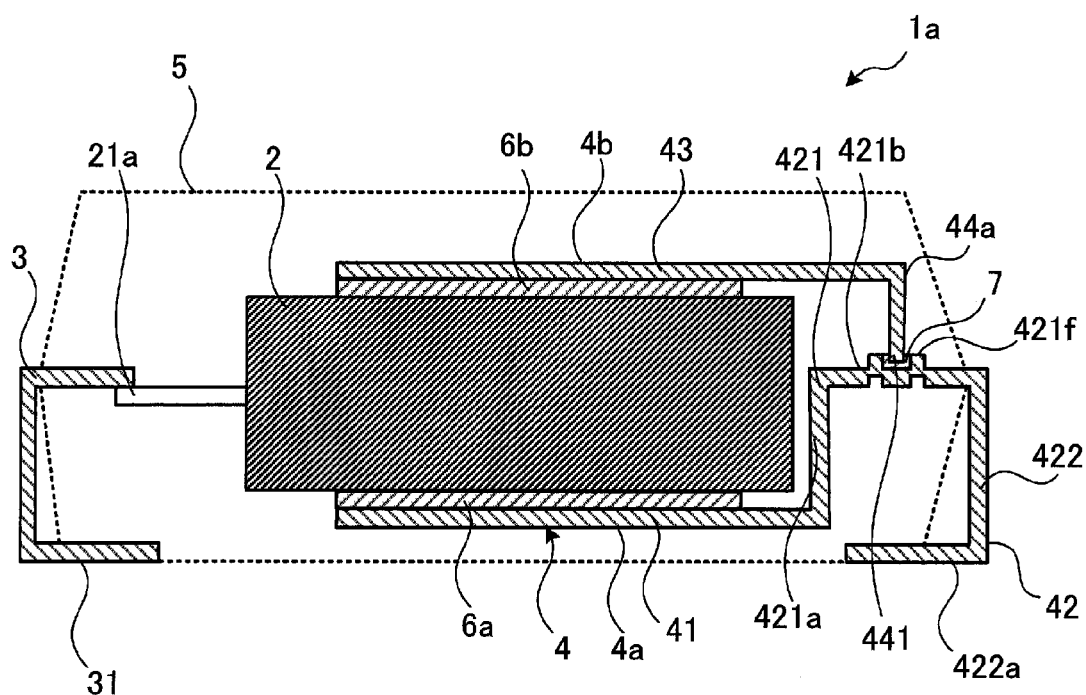
FIG. 8 illustrates a longitudinal section of a solid electrolytic capacitor according to a second embodiment.

FIG. 8 illustrates a longitudinal section of the solid electrolytic capacitor according to the second embodiment.

The terminal connecting portion 44a according to the second embodiment is shorter than the terminal connecting portion 44 in the vertical direction of FIG. 8.

Furthermore, one or more protrusions (first engagement portions) 421f are provided on the top 421b to hold the terminal connecting portion 44a.

The protrusions 421f are formed, for example, by die extrusion.

The terminal connecting portion 44a engages with the protrusion 421f with a connecting member 7 therebetween.

Figure 9A:
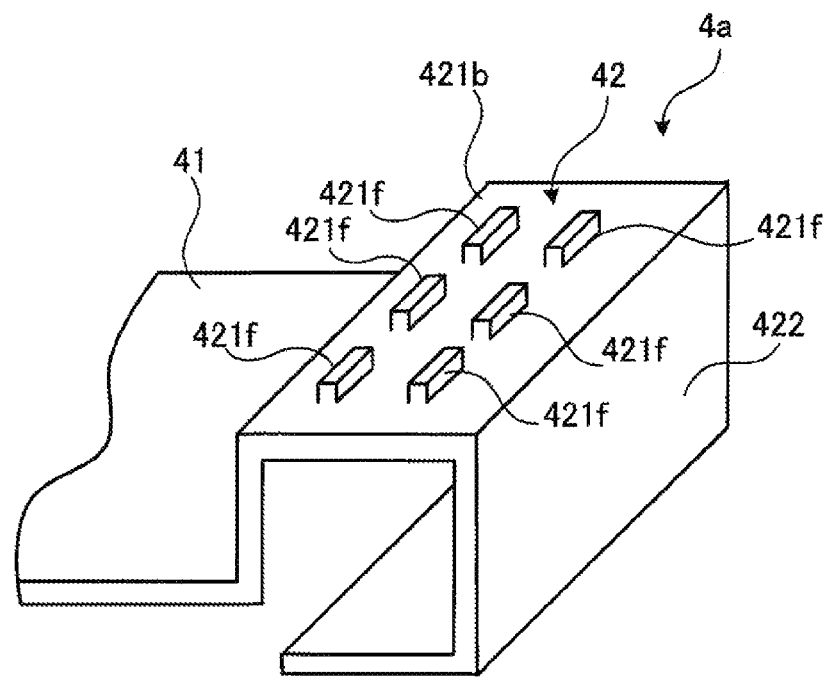
FIGS. 9A and 9B are enlarged views illustrating engagement between a cathode metal plate terminal and an auxiliary cathode metal plate of the solid electrolytic capacitor according to the second embodiment.
Figure 9B:
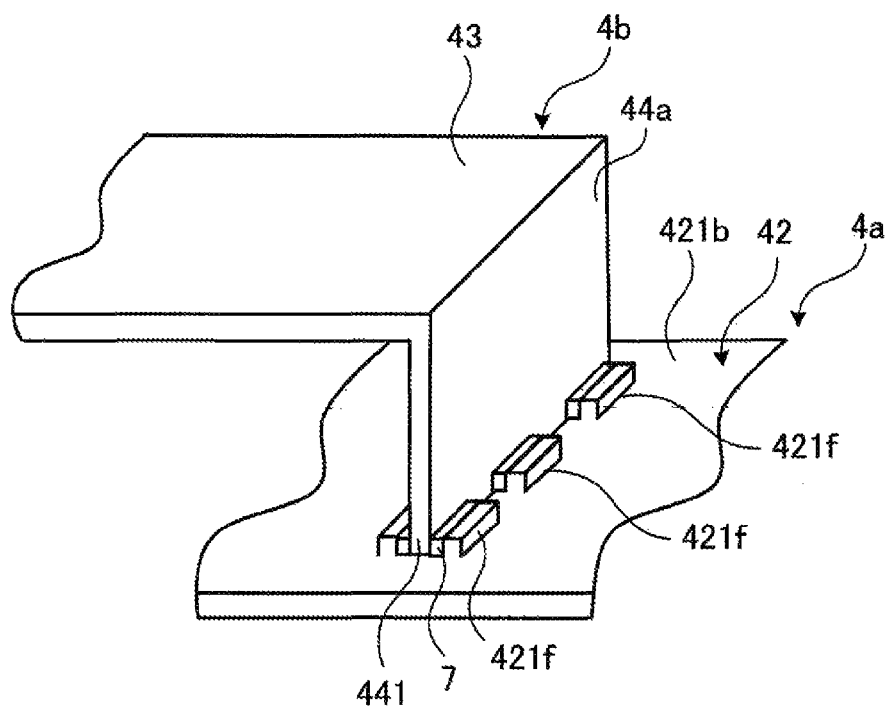

FIGS. 9A and 9B are enlarged views illustrating engagement between a cathode metal plate terminal and an auxiliary cathode metal plate of the solid electrolytic capacitor according to the second embodiment.

FIG. 9A is an enlarged view illustrating the cathode terminal metal plate 4a alone. FIG. 9B is an enlarged view illustrating a state that the cathode terminal metal plate 4a and the auxiliary cathode metal plate 4b are engaged with each other.

Referring to FIGS. 9A and 9B, the solid electrolytic capacitor 1a according to the second embodiment includes three protrusions 421f spaced uniformly in two lines on the top 421b in the depth direction of FIGS. 9A and 9B.

The end 441 is inserted between two lines of neighboring protrusions 421f. Specifically, multiple pairs of protrusions 421f are arranged opposite to each other across the end 441. In this position, the edge of the end 441 is fixed to either side of each protrusion 421f with a conductive connecting member 7 therebetween. The terminal connecting portion 44a is electrically connected to the rising portion 421 in this way. Furthermore, the motion of the auxiliary cathode metal plate 4b is prevented in the horizontal direction of FIGS. 9A and 9B.

The solid electrolytic capacitor 1a produces the same effects as in the solid electrolytic capacitor 1.

Although three protrusions 421f are provided in each line so that six protrusions 421f are provided in total in FIGS. 9A and 9B, one, two, four, or more protrusions 421f may be provided in each line.

Furthermore, the two lines of protrusions 421f may be formed from different numbers of protrusions 421f.

Furthermore, although the protrusions 421f in the two lines face each other in FIGS. 9A and 9B, the embodiment may be modified to place those protrusions 421f in a zigzag manner, or in alternating positions.

Third Embodiment

Next, a solid electrolytic capacitor according to a third embodiment is described.

Hereinafter, a description is given mainly for the differences between the third embodiment and the first embodiment, and the description of their similarities is omitted here.

Figure 10:
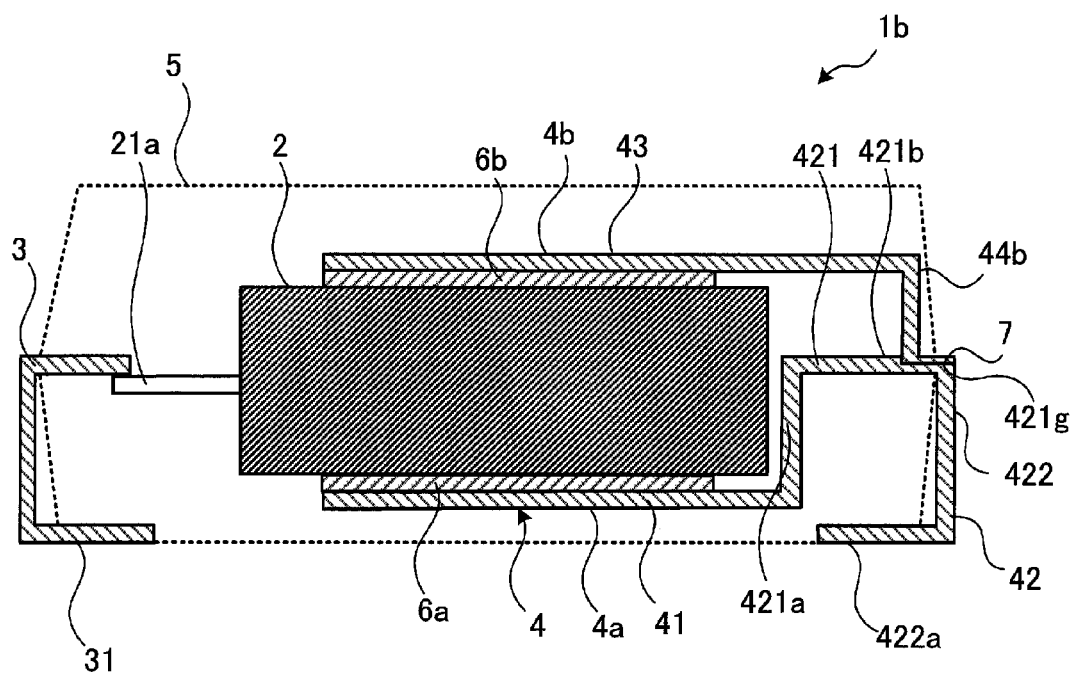
FIG. 10 illustrates a longitudinal section of a solid electrolytic capacitor according to a third embodiment.

FIG. 10 illustrates a longitudinal section of a solid electrolytic capacitor according to the third embodiment.

The solid electrolytic capacitor 1b according to the third embodiment illustrated in FIG. 10 has the same configuration as in the solid electrolytic capacitor 1 according to the first embodiment, except the structures of the cathode terminal metal plate 4a and the auxiliary cathode metal plate 4b.

On a part of the top 421b of the solid electrolytic capacitor 1b, a groove (first engagement portion) 421g is provided to be open outward from the top 421b (direction away from the capacitor element 2).

The groove 421g is about 0.1 mm deep.

The groove 421g is easily formed, for example, by extruding the part corresponding to the groove 421g of the rising portion 421 with a die, or by engraving the part.

The terminal connecting portion 44b engages with the groove 421g with a connecting member 7 therebetween.

Figure 11A:
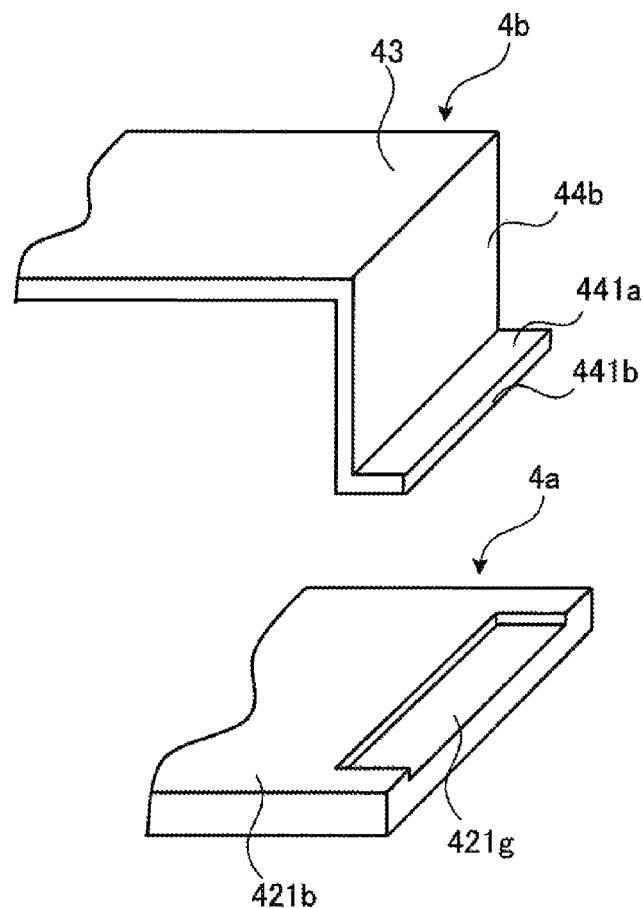
FIGS. 11A and 11B are enlarged views illustrating engagement between a cathode metal plate terminal and an auxiliary cathode metal plate of the solid electrolytic capacitor according to the third embodiment.
Figure 11B:
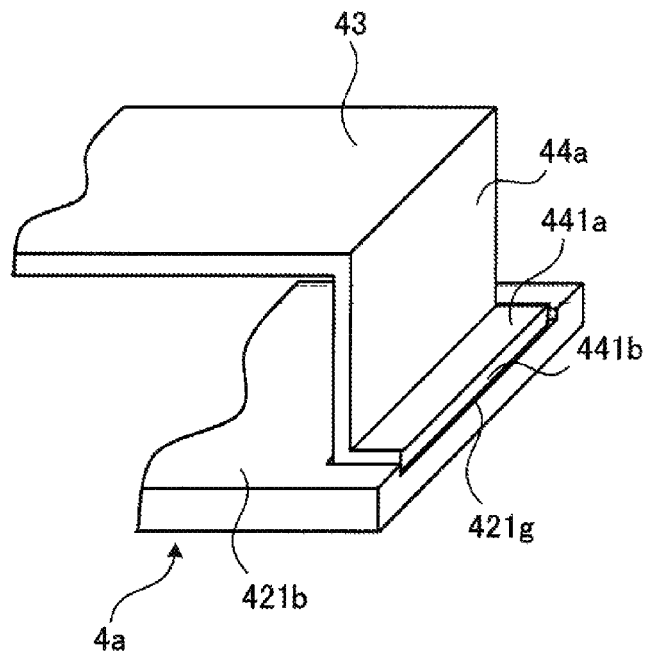

FIGS. 11A and 11B are enlarged views illustrating engagement between a cathode metal plate terminal and an auxiliary cathode metal plate of the solid electrolytic capacitor according to the third embodiment.

FIG. 11A illustrates a state that the cathode terminal metal plate 4a and the auxiliary cathode metal plate 4b are separated from each other. FIG. 11B illustrates a state that the cathode terminal metal plate 4a and the auxiliary cathode metal plate 4b are joined together. In FIGS. 11A and 11B, the connecting member 7 is omitted.

The end 441 of the terminal connecting portion 44b includes an L-shaped flange 441a bending to the right as seen in FIG. 11A. The bottom surface of the flange 441a is larger than the end face 441b of the end 441.

This flange 441a expands the contact area between the auxiliary cathode metal plate 4b and the cathode terminal metal plate 4a.

The flange 441a is fitted into the groove 421g. In this position, the bottom of the flange 441a is fixed to the bottom of the groove 421g with a conductive connecting member 7 therebetween (not illustrated). Furthermore, both longitudinal ends of the flange 441a are fixed to the longitudinal walls of the groove 421g with the conductive connecting member 7 therebetween. The terminal connecting portion 44b is electrically connected to the rising portion 421 in this way. This mechanical structure prevents the auxiliary cathode metal plate 4b from moving in the left direction and in the depth direction of FIGS. 11A and 11B.

The solid electrolytic capacitor 1b produces the same effects as in the foregoing solid electrolytic capacitor 1.

Fourth Embodiment

Next, a solid electrolytic capacitor according to a fourth embodiment is described.

Hereinafter, a description is given mainly for the differences between the solid electrolytic capacitor according to the fourth embodiment and the solid electrolytic capacitor 1 according to the first embodiment, and the description of their similarities is omitted here.

Figure 12:
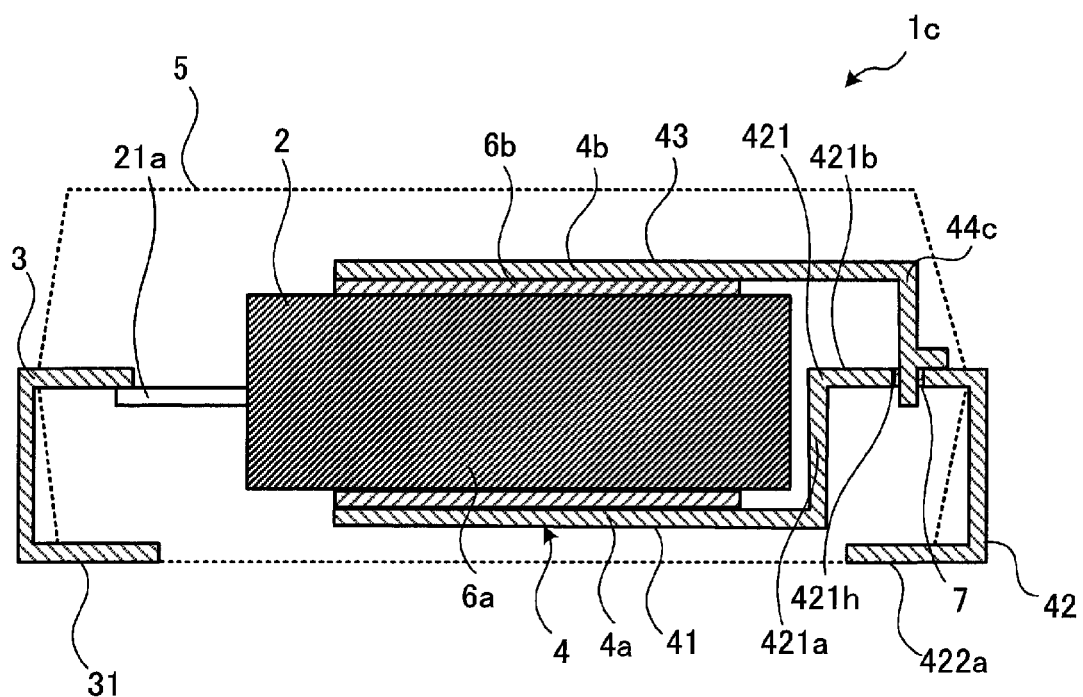
FIG. 12 illustrates a longitudinal section of a solid electrolytic capacitor according to a fourth embodiment.

FIG. 12 illustrates a longitudinal section of a solid electrolytic capacitor according to the fourth embodiment.

The solid electrolytic capacitor 1c according to the fourth embodiment illustrated in FIG. 12 has the same configuration as in the solid electrolytic capacitor 1 according to the first embodiment, except the structures of the cathode terminal metal plate 4a and the auxiliary cathode metal plate 4b.

On a nearly central part of the top 421b of the solid electrolytic capacitor 1c, a slit (first engagement portion) 421h is provided.

The terminal connecting portion 44c engages with the slit 421h with a connecting member 7 therebetween.

Figure 13A:
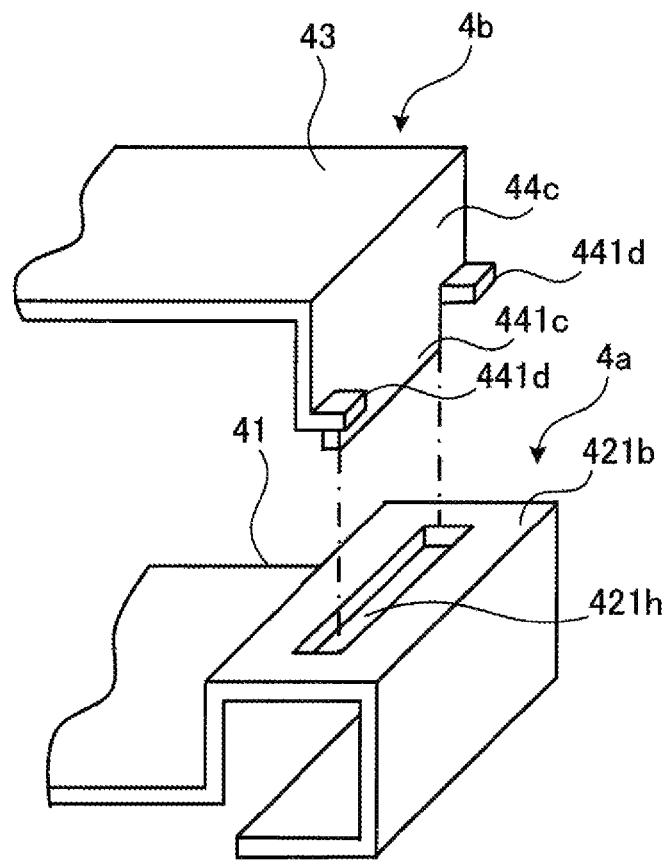
FIGS. 13A and 13B are enlarged views illustrating engagement between a cathode metal plate terminal and an auxiliary cathode metal plate of the solid electrolytic capacitor according to the fourth embodiment.
Figure 13B:
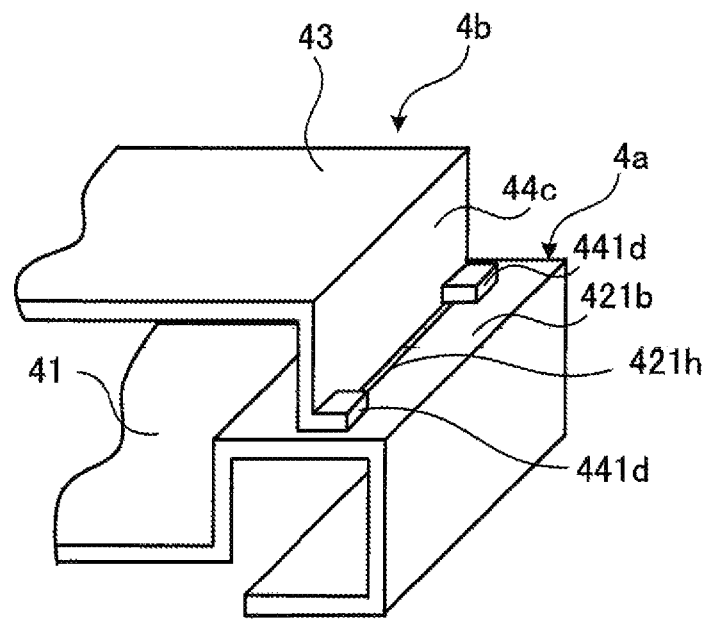

FIGS. 13A and 13B are enlarged views illustrating engagement between a cathode metal plate terminal and an auxiliary cathode metal plate of the solid electrolytic capacitor according to the fourth embodiment.

FIG. 13A illustrates a state that the cathode terminal metal plate 4a and the auxiliary cathode metal plate 4b are separated from each other. FIG. 13B illustrates a state that the cathode terminal metal plate 4a and the auxiliary cathode metal plate 4b are joined together. In FIGS. 13A and 13B, the connecting member 7 is omitted.

The end 441 of the terminal connecting portion 44c includes a projecting portion 441c to be fitted into the slit 421h, and stoppers (defining portions) 441d for defining the insert position of the projecting portion 441c into the slit 421h.

The stoppers 441d and 441d are provided on both sides of the projecting portion 441c. Both stoppers 441d and 441d are perpendicular to the right-hand surface of the terminal connecting portion 44c as seen in FIG. 13A.

Each stopper 441d is easily formed, for example, by bending.

Although the stoppers 441d are provided on both sides of the projecting portion 441c in FIGS. 13A and 13B, the embodiment may be modified to provide a stopper 441d on only one side of the same.

The size (length, width) of the slit 421h is the same as that of the projecting portion 441c, or slightly larger than that of the projecting portion 441c. This allows the projecting portion 441c to be inserted in the slit 421h.

The slit 421h is easily formed, for example, by shearing or cutting.

The projecting portion 441c is fitted into the slit 421h. In this position, the sides of the projecting portion 441c are fixed to the slit 421h with the conductive connecting member 7 therebetween. The terminal connecting portion 44c is electrically connected to the rising portion 421 in this way. Furthermore, this mechanical structure prevents the auxiliary cathode metal plate 4b from moving in both horizontal and depth directions of FIGS. 13A and 13B.

Since the stoppers 441d are in contact with the top 421b, the projecting portion 441c stops the slit 421h at a predetermined position, thereby preventing the projecting portion 441c from being inserted too deep into the slit 421h. Specifically, the stoppers 441d prevent the projecting portion 441c from falling into the slit 421h, and work as a positioning guide at the time of manufacturing. Therefore, the positioning accuracy of the auxiliary cathode metal plate 4b is improved at the time of manufacturing.

The method of fixing the projecting portion 441c to the slit 421h is not limited to a specific one. For example, the projecting portion 441c and the slit 421h may be fixed to each other by welding.

The solid electrolytic capacitor 1c produces the same effects as in the solid electrolytic capacitor 1.

Although the stoppers 441d and 441d are provided outside in this embodiment, the stoppers 441d and 441d may be provided inside (direction closer to the capacitor element 2).

<Exemplary Modification to Fourth Embodiment>

Figure 14A:
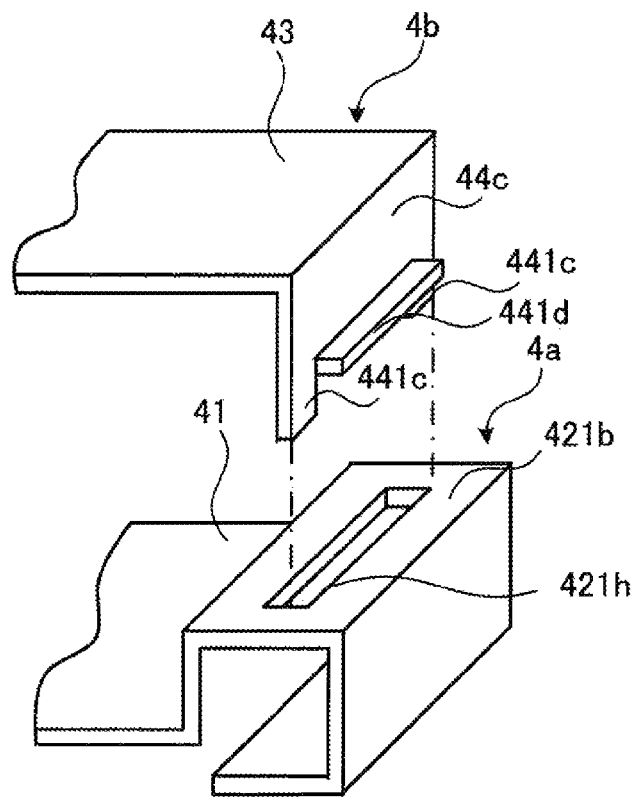
FIGS. 14A and 14B are enlarged views illustrating engagement between a cathode metal plate terminal and an auxiliary cathode metal plate of a solid electrolytic capacitor according to an exemplary modification to the fourth embodiment.
Figure 14B:
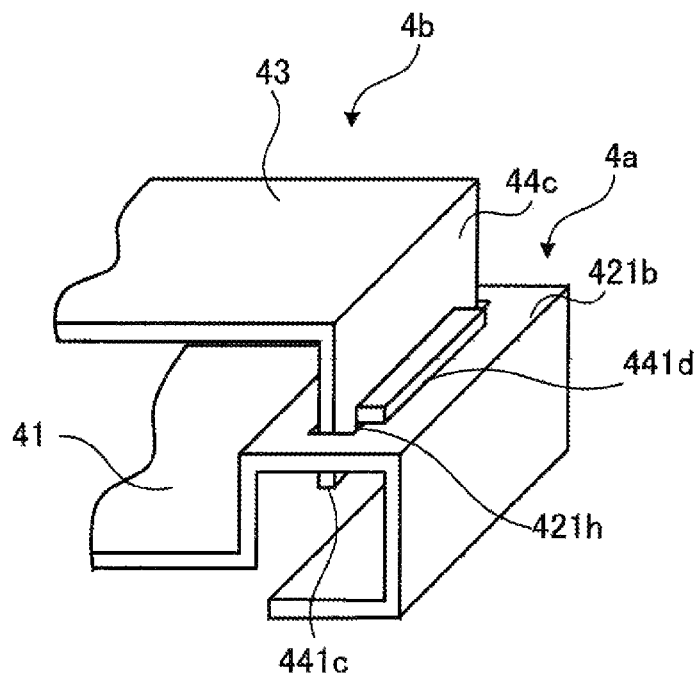

FIGS. 14A and 14B are enlarged views illustrating engagement between a cathode metal plate terminal and an auxiliary cathode metal plate of a solid electrolytic capacitor according to an exemplary modification to the fourth embodiment.

FIG. 14A illustrates a state that the cathode terminal metal plate 4a and the auxiliary cathode metal plate 4b are separated from each other. FIG. 14B illustrates a state that the cathode terminal metal plate 4a and the auxiliary cathode metal plate 4b are joined together. In FIGS. 14A and 14B, the connecting member 7 is omitted.

The solid electrolytic capacitor 1c illustrated in FIGS. 14A and 14B includes a stopper 441d on a nearly central part of the end 441. On both sides of the stopper 441d, projecting portions 441c and 441c are provided to be fitted into the slit 421h.

The solid electrolytic capacitor 1c having the projecting portions 441c and the stopper 441d also produces the same effects.

Fifth Embodiment

Next, a solid electrolytic capacitor according to a fifth embodiment is described.

Hereinafter, a description is given mainly for the differences, between the solid electrolytic capacitor according to the fifth embodiment and the solid electrolytic capacitor according to the first embodiment, and the description of their similarities is omitted here.

Figure 15:
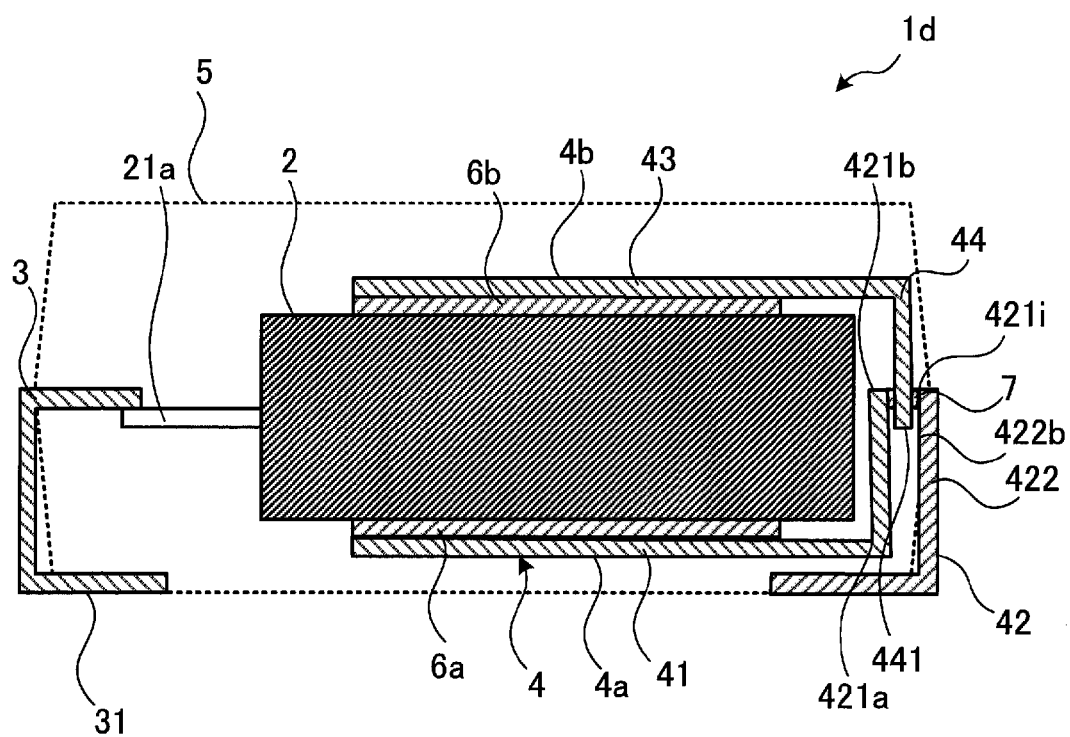
FIG. 15 illustrates a longitudinal section of a solid electrolytic capacitor according to a fifth embodiment.

FIG. 15 illustrates a longitudinal section of a solid electrolytic capacitor according to the fifth embodiment.

The solid electrolytic capacitor 1d according to the fifth embodiment illustrated in FIG. 15 has the same configuration as in the solid electrolytic capacitor 1 according to the first embodiment, except the structure of the cathode terminal metal plate 4a.

The top 421b of the rising portion 421 of the solid electrolytic capacitor 1d is smaller than its counterpart of the solid electrolytic capacitor 1 according to the first embodiment.

The solid electrolytic capacitor 1d includes a slit (first engagement portion) 421i, instead of the groove 421c in the first embodiment, to receive an end 441 of the terminal connection portion 44.

Furthermore, an inner side 422b of the outer terminal portion 422 according to this embodiment is partially sealed with a mold 5.

Figure 16:
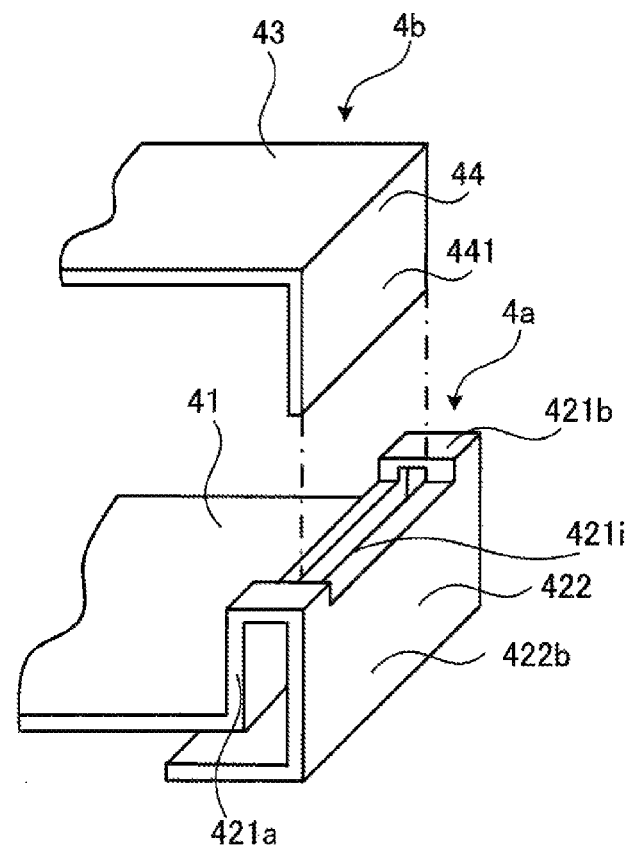
FIGS. 16A and 16B are enlarged views illustrating engagement between a cathode metal plate terminal and an auxiliary cathode metal plate of the solid electrolytic capacitor according to the fifth embodiment.
Figure 16B:
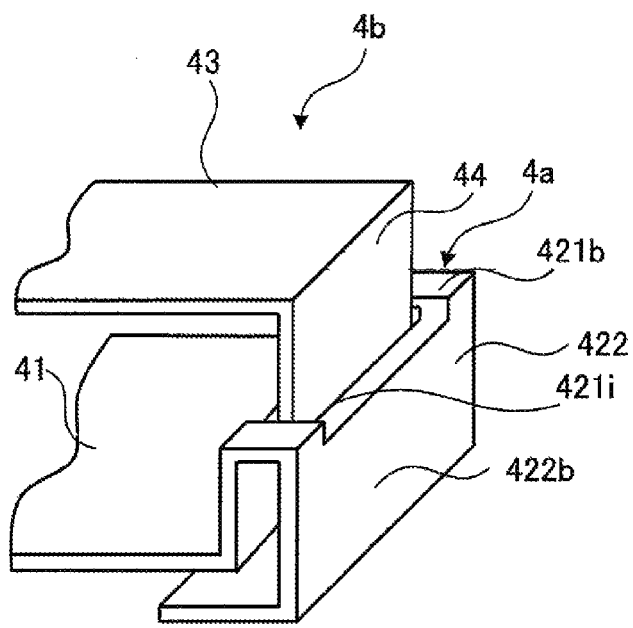

FIGS. 16A and 16B are enlarged views illustrating engagement between a cathode metal plate terminal and an auxiliary cathode metal plate of the solid electrolytic capacitor according to the fifth embodiment.

FIG. 16A illustrates a state that the cathode terminal metal plate 4a and the auxiliary cathode metal plate 4b are separated from each other. FIG. 16B illustrates a state that the cathode terminal metal plate 4a and the auxiliary cathode metal plate 4b are joined together. In FIGS. 16A and 16B, the connecting member 7 is omitted.

The size of the slit 421i is the same as that of the end 441 of the auxiliary cathode metal plate 4b, or slightly larger than that of the end 441. This allows the end 441 to be fitted into the groove 421c.

The slit 421i is easily formed, for example, by shearing or cutting.

The slit 421i is formed by partially removing the top 421b of the rising portion 421, the wall 421a thereof, and the outer terminal portion 422. The wall 421a of the rising portion 421 and the side 422b of the outer terminal portion 422 serve as side walls of the slit 421i.

According to the fifth embodiment, the width of the top 421b in the horizontal direction of FIG. 16A is shorter than that in the first embodiment.

The end 441 is fitted into the slit 421i to a predetermined depth. In this position, the sides of the end 441 are fixed to the slit 421i with the conductive connecting member 7 therebetween. The terminal connecting portion 44 is electrically connected to the rising portion 421 in this way. This mechanical structure prevents the auxiliary cathode metal plate 4b from moving in both horizontal and depth directions of FIGS. 16A and 16B.

The solid electrolytic capacitor 1d produces the same effects as in the solid electrolytic capacitor 1.

According to the solid electrolytic capacitor 1d, the size of the top 421b of the rising portion 421 becomes smaller, thereby miniaturizing the solid electrolytic capacitor 1d.

Next, a description is given for an example in which the solid electrolytic capacitor 1 is used for a power supply circuit.

<Power Supply Circuit>

Figure 17:
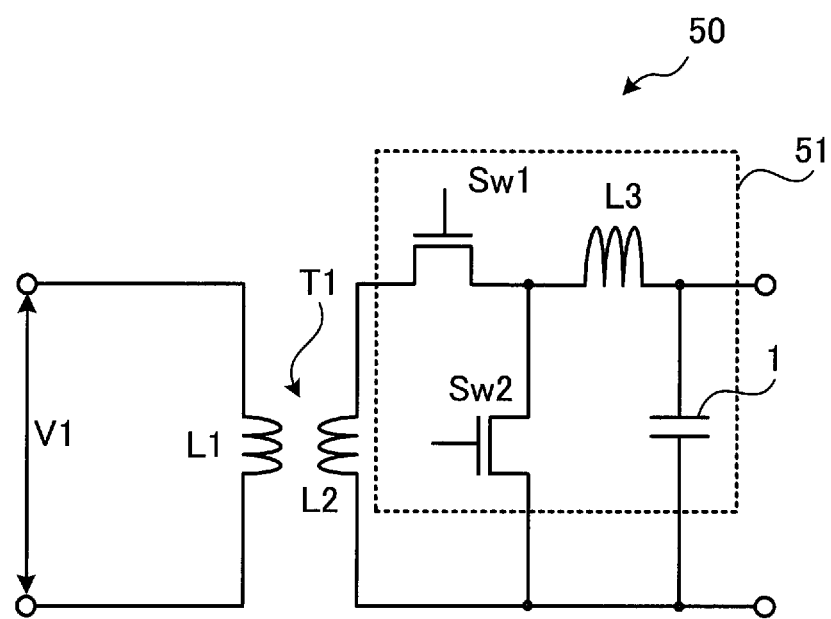
FIG. 17 illustrates a power supply circuit including a solid electrolytic capacitor.

FIG. 17 illustrates a power supply circuit including a solid electrolytic capacitor.

The illustrated power supply circuit 50 includes a transformer T1 where a switched direct-current (DC) voltage V1 is applied to the primary coil L1.

The transformer T1 steps up and down the input voltage V1 to a desired voltage. The pulsed output at the secondary coil L2 is rectified and smoothed by a smoothing circuit 51 on the secondary side, so that a desired DC power is obtained. The obtained DC power is supplied to electronic equipment (for example, integrated circuit 60 in FIG. 18).

The smoothing circuit 51 includes switches Sw1 and Sw2 for rectification, and an inductor L3 and a solid electrolytic capacitor 1 for smoothing.

The power supply circuit 50 has a low equivalent series resistance and only a slight variation in the resistance value.

Figure 18:
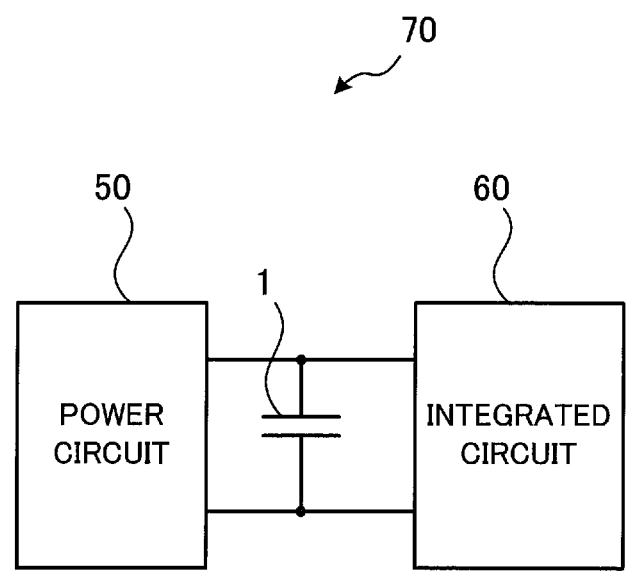
FIG. 18 illustrates an example of a circuit including the power supply circuit of FIG. 17.

FIG. 18 illustrates an example of a circuit including the power supply circuit of FIG. 17.

Referring to FIG. 18, in a circuit 70, a solid electrolytic capacitor 1 is connected between the ground line and the power-supply line which connects the power supply circuit 50 with an integrated circuit 60 including a CPU.

In this circuit 70, the variation ΔV of supply voltage is given by the following equation (1).

$$\Delta V = I p \times R \tag{1}$$

where Ip represents a ripple current of the solid electrolytic capacitor 1 due to the changing current consumption of the integrated circuit 60, and R represents ESR of the solid electrolytic capacitor 1.

Therefore, by reducing the ESR value R of the solid electrolytic capacitor, the voltage variation ΔV is also reduced.

Equation (1) indicates that the voltage variation ΔV is proportional to ESR values. If a large variation ΔV appears at the power supply line as a result of a high ESR, the supply voltage may fall below the recommended operating voltage of the integrated circuit 60, which could make the integrated circuit 60 malfunction or stop its operation. In other words, the circuit 70 would not be able to achieve its needed performance. By contrast, the present embodiment offers a low and stable ESR, thus enabling the circuit 70 to operate reliably and achieve the needed performance.

Although not illustrated, it has been a conventional practice to place a plurality of solid electrolytic capacitors 1 in parallel so that a further lower ESR is obtained, and usually a larger number of solid electrolytic capacitors have to be connected than really needed, in consideration of an expected increase in ESR. The proposed techniques eliminate the need for such extra capacitors because the proposed solid electrolytic capacitor 1 maintains its low ESR in a stable and reliable way. In addition to the miniaturization of the solid electrolytic capacitor 1 itself, the proposed techniques also contribute to miniaturization and high-density integration of the circuit 70.

The solid electrolytic capacitor and the power supply circuit according to the foregoing embodiments are not limited to any specific examples which have been described with reference to the accompanying drawings. The configuration of each part may be replaced with any other configuration having the same function. Various modifications and additions may be made to the foregoing embodiments.

The features described above and illustrated in the drawings can be used in any arbitrary combination. For example, in the first embodiment, a slit 421*i* may be provided instead of the groove 421*c*.

In the foregoing embodiments, the groove 421*c* or slit 421*h* provided on the cathode terminal metal plate 4*a* engages with the end 441 of the auxiliary cathode metal plate 4*b*. However, the embodiments may be modified such that the auxiliary cathode metal plate 4*b* includes a groove or a slit that engages with a part of the cathode terminal metal plate 4*a*.

According to the foregoing embodiments, the disclosed solid electrolytic capacitors have a reliable structure to achieve a low ESR.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A solid electrolytic capacitor comprising:
   a capacitor element having two opposite cathode surfaces;
   a first electrode member including a first connecting portion electrically connected to one of the two opposite cathode surfaces of the capacitor element; and
   a second electrode member including a second connecting portion electrically connected to the other one of the two opposite cathode surface of the capacitor element, wherein:
   the first electrode member further includes a first engagement portion that is electrically connected to the first connecting portion,
   the second electrode member further includes a second engagement portion that is electrically connected to the second connecting portion and engages with the first engagement portion, and
   either one of the first electrode member and the second electrode member includes an outer terminal portion.

2. The solid electrolytic capacitor according to claim 1, wherein:
   the second engagement portion includes a plate-shaped end portion, and
   the first engagement portion includes a groove to receive the plate-shaped end portion.

3. The solid electrolytic capacitor according to claim 2, wherein longitudinal ends of the groove are open.

4. The solid electrolytic capacitor according to claim 2, wherein there is a space between an end face of the plate-shaped end portion and a bottom of the groove.

5. The solid electrolytic capacitor according to claim 1, wherein:
   the second engagement portion includes a plate-shaped end portion, and
   the first engagement portion includes at least two protrusions opposite to each other across the plate-shaped end portion.

6. The solid electrolytic capacitor according to claim 1, wherein:
   the second engagement portion has an enlarged end portion, and
   the first engagement portion has a groove to receive the enlarged end portion.

7. The solid electrolytic capacitor according to claim 6, wherein at least one side of the groove is open.

8. The solid electrolytic capacitor according to claim 7, wherein:
   the first engagement portion includes a rising portion having a top and a wall that raises the top above the first connecting portion, and
   the groove is provided on the top of the rising portion, the at least one open side of the groove lying on an outward edge of the top.

9. The solid electrolytic capacitor according to claim 1, wherein:
   the second engagement portion includes a plate-shaped end portion, and
   the first engagement portion includes a slit into which the plate-shaped end portion is inserted.

10. The solid electrolytic capacitor according to claim 9, wherein the second engagement portion includes a defining portion which defines an insertion depth of the end portion.

11. The solid electrolytic capacitor according to claim 9, wherein:
    the first engagement portion includes a rising portion having a top and a wall that raises the top above the first connecting portion,
    the outer terminal portion is part of the first electrode member and located opposite to the wall of the rising portion,
    the slit is formed by partly removing the top of the rising portion, and
    the wall of the rising portion and the outer terminal portion support the plate-shaped end portion inserted into the slit.

12. A power circuit comprising a solid electrolytic capacitor which includes:
    a capacitor element having two opposite cathode surfaces;

a first electrode member having a first connecting portion electrically connected to one of the two opposite cathode surfaces of the capacitor element; and a second electrode member having a second connecting portion electrically connected to the other one of the two opposite cathode surfaces of the capacitor element, wherein:

the first electrode member further includes a first engagement portion that is electrically connected to the first connecting portion, the second electrode member further includes a second engagement portion that is electrically connected to the second connecting portion and engages with the first engagement portion, and either one of the first electrode member and the second electrode member includes an outer terminal portion.

* * * * *